US006713418B2

(12) United States Patent
Kishimoto et al.

(10) Patent No.: US 6,713,418 B2
(45) Date of Patent: Mar. 30, 2004

(54) GLASS ARTICLE AND GLASS SUBSTRATE FOR INFORMATION RECORDING MEDIA USING THE SAME

(75) Inventors: Shoichi Kishimoto, Osaka (JP); Akihiro Koyama, Osaka (JP); Hiroyuki Tanaka, Osaka (JP); Nobuyuki Yamamoto, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/156,182

(22) Filed: May 29, 2002

(65) Prior Publication Data

US 2002/0193233 A1 Dec. 19, 2002

(30) Foreign Application Priority Data

May 29, 2001 (JP) .................................. P. 2001-161115

(51) Int. Cl.$^7$ ............................................... C03C 3/087
(52) U.S. Cl. ................................... 501/70; 501/69
(58) Field of Search ........................................ 501/69, 70

(56) References Cited

U.S. PATENT DOCUMENTS

| | | | | |
|---|---|---|---|---|
| 5,902,665 A | * | 5/1999 | Kuroda | 428/141 |
| 6,251,812 B1 | * | 6/2001 | Koyama et al. | 501/69 |
| 6,306,786 B1 | * | 10/2001 | Koyama et al. | 501/69 |
| 6,333,286 B1 | * | 12/2001 | Kurachi et al. | 501/69 |
| 6,365,534 B1 | * | 4/2002 | Koyama et al. | 501/69 |
| 6,399,527 B1 | * | 6/2002 | Kishimoto et al. | 501/69 |
| 6,413,892 B1 | * | 7/2002 | Koyama et al. | 501/64 |
| 6,436,859 B1 | * | 8/2002 | Muramoto et al. | 501/69 |

FOREIGN PATENT DOCUMENTS

| | | | | |
|---|---|---|---|---|
| JP | 11-16142 A | 1/1999 | | |
| JP | 11-16143 A | 1/1999 | | |
| JP | 11-16151 A | 1/1999 | | |
| JP | 11302032 A | * | 11/1999 | C03C/3/085 |
| JP | 2000-357318 A | 12/2000 | | |
| WO | WO 98/58883 | * | 12/1998 | |

\* cited by examiner

*Primary Examiner*—David Sample
*Assistant Examiner*—Elizabeth A. Bolden
(74) *Attorney, Agent, or Firm*—Sughrue Mion, PLLC

(57) ABSTRACT

A glass article of the present invention has a rate of dissolution in an acidic liquid of from 10 to 100 nm/min in terms of etching rate in immersing in a 0.1% by weight 50° C. aqueous solution of hydrofluoric acid and an average linear thermal expansion coefficient of $70 \times 10^{-7}$/° C. or higher as measured in the range of from −50° C. to 70° C., and the working temperature $T_4$ (° C.) and the liquidus temperature $T_L$ (° C.) thereof satisfy the relationship: $T_4 - T_L \geq -100°$ C.

9 Claims, No Drawings

GLASS ARTICLE AND GLASS SUBSTRATE FOR INFORMATION RECORDING MEDIA USING THE SAME

FIELD OF THE INVENTION

The present invention relates to a glass article which is suitable for use as a substrate for information recording media such as, e.g., hard disks and optomagnetic disks, a substrate for electrical/electronic parts, an optical part, and a substrate for optical parts, and which has a high coefficient of thermal expansion even at low temperatures and can be easily produced by the float process. The invention further relates to a glass article capable of readily giving a clean glass surface through cleaning with an acidic cleaning fluid.

DESCRIPTION OF THE RELATED ART

With recent progress in the handling of digital information, the desire for a small storage medium having a large capacity is becoming extremely strong. For satisfying the desire, it is essential to heighten the recording density. At present, the storage medium which has a satisfactory balance among storage capacity, device size, cost, etc. is the hard disk device (HDD) employing a glass substrate. Besides being used in computers heretofore, hard disks are expected to be used in large quantities in domestic electrical appliances such as video recorders, cameras, and television receivers in the future. For realizing a hard disk having a heightened recording density, it is necessary to employ a substrate which not only has enhanced surface flatness but can be easily mass-produced.

A glass which is for use as a glass substrate for information recording media and is suitable for mass production is disclosed in Japanese Patent Laid-Open No. 357318/2000 so as to meet the desire. There is a description therein to the effect that this glass for substrate use has a Young's modulus of 85 GPa or higher and excellent weatherability and is suitable for mass production by a continuous forming method, e.g., the float process.

On the other hand, in hard disks employing a glass substrate, the other mechanical parts include ones made of a metal, e.g., stainless steel, although the substrate is made of a glass. Glasses differ from metals in the coefficient of thermal expansion. The glass substrates which have hitherto been used as substrates for hard disks generally have a lower coefficient of thermal expansion than metals, and there has been a considerable difference between these two kinds of materials in the coefficient of thermal expansion especially in the low-temperature range of from −50° C. to 70° C. (a temperature range centering around room temperatures at which appliances are used). Such a difference in thermal expansion coefficient results in a difference in expansion/contraction behavior with changing temperature between the substrate and the metallic mechanical parts. As a result, it becomes difficult to maintain the accuracy of the relative positions of a magnetic head for recorded-signal readout and recording bits.

Substrates made of a crystallized glass as a material relatively close to metals in thermal expansion coefficient have been disclosed. For example, the crystallized glasses disclosed in Japanese Patent Laid-Open Nos. 16142/1999, 16143/1999, and 16151/1999 are ones formed by precipitating lithium disilicate, α-quartz, a solid solution thereof, α-cristobalite, and a solid solution thereof so as to have a coefficient of thermal expansion close to that of metals. Furthermore, Japanese Patent Laid-Open No. 301732/1997 discloses a glass for substrate use which has a high coefficient of thermal expansion.

However, the related-art techniques have had the following problems. The glass for substrate use disclosed in Japanese Patent Laid-Open No. 357318/2000, which includes no description concerning thermal expansion coefficient, can arouse troubles attributable to a difference in thermal expansion coefficient between the glass substrate and other components of a hard disk. Another drawback is that since the content of alkali oxides ($R_2O=Li_2O+Na_2O+K_2O$) in the glass is low, the glass has poor suitability for chemical strengthening (a compression layer reaching a sufficient depth from the surface cannot be formed; a high surface compression stress cannot be attained) and hence has low mechanical strength even after an ion-exchange treatment. Furthermore, since the glass has a high total content of $SiO_2$ and $Al_2O_3$ besides the low alkali oxide content, the glass tends to have a high melt viscosity and a high melting temperature (temperature $T_2$ at which the viscosity reaches $10^2$ P). Namely, a high temperature is necessary for melting, and this not only results in an increased fuel cost and considerable deterioration of glass-melting apparatus but also poses a problem that the glass melt has poor homogeneity and hence gives a substrate glass having poor homogeneity. Because of this, the glass plate produced has unallowable defects such as warpage and undulation.

The crystallized glasses disclosed in Japanese Patent Laid-Open Nos. 16142/1999, 16143/1999, and 16151/1999 necessitate a heat treatment for crystal precipitation after the production of a raw glass. For example, in the technique disclosed in Japanese Patent Laid-Open No. 16143/1999, a raw glass is heat-treated at 450 to 550° C. for 1 to 12 hours, subsequently further heat-treated at 600 to 800° C. for 1 to 12 hours, and then polished. Namely, this related-art technique necessitates heat treatments in the period of from raw glass production to polishing. This is an important factor inhibiting the reduction of production cost. Furthermore, the glass in which crystals can be precipitated by a heat treatment has a serious drawback that since this glass is more susceptible to crystal precipitation, i.e., devitrification, than other glasses (glasses to be finally used as amorphous glasses), it undesirably devitrifies in glass production by a continuous process such as, e.g., the float process.

The glass for use as substrates disclosed in Japanese Patent Laid-Open No. 301732/1997 has a coefficient of thermal expansion as high as $75 \times 10^{-7}/°$ C. or above in the temperature range of from 50 to 350° C. However, there is no description therein concerning thermal expansion coefficient at low temperatures of from −50° C. to 70° C. Furthermore, this glass for substrate use has a drawback that since it does not contain $Li_2O$, it has poor suitability for chemical strengthening and hence has low strength even after an ion-exchange treatment.

SUMMARY OF THE INVENTION

The invention has been achieved in view of the above-described problems of the related-art techniques. An aim of the invention is to provide a glass which has a high coefficient of thermal expansion at low temperatures (around room temperature), is capable of giving a clean surface free from defects such as mars through cleaning with, e.g., an acidic cleaning fluid, and can be easily mass-produced at low cost. Another aim of the invention is to provide at low cost a substrate which satisfactorily matches in thermal expansion coefficient with metallic components of an information recording device.

The invention has been achieved in order to eliminate the problems of the related-art techniques described above and to accomplish a technical subject for obtaining a substrate suitable for high-density recording. As a result of intensive investigations on the compositions of aluminosilicate glasses, it has become possible to provide a glass having a high coefficient of thermal expansion at low temperatures and having a moderate rate of etching with hydrofluoric acid by ingeniously balancing the contents of components. It has further becomes possible to provide a glass article which can be produced by the float process, which can yield glass plates on a large scale, without raising technical difficulties in melting and plate formation. The present invention has the following constitution.

(1) A glass article having:
  a rate of dissolution in an acidic liquid of from 10 to 100 nm/min in terms of an etching rate in immersing in a 0.1% by weight 50° C. aqueous solution of hydrofluoric acid; and
  an average linear thermal expansion coefficient of $70 \times 10^{-7}$/° C. or higher as measured in the range of from $-50°$ C. to 70° C.,
  in which a working temperature of the glass article: $T_4$ ° C. and a liquidus temperature of the glass article: $T_L$ ° C. satisfy the relationship: $T_4 - T_L \geq -100°$ C.

(2) A glass article having:
  a rate of dissolution in an acidic liquid of from 10 to 100 nm/min in terms of an etching rate in immersing in a 0.1% by weight 50° C. aqueous solution of hydrofluoric acid; and
  an average linear thermal expansion coefficient of $80 \times 10^{-7}$/° C. to $110 \times 10^{-7}$/° C. as measured in the range of from $-50°$ C. to 70° C.,
  in which a working temperature of the glass article: $T_4$ ° C. and a liquidus temperature of the glass article: $T_L$ ° C. satisfy the relationship: $T_4 - T_L \geq -100°$ C.

(3) A glass article having:
  a rate of dissolution in an acidic liquid of from 10 to 100 nm/min in terms of an etching rate in immersing in a 0.1% by weight 50° C. aqueous solution of hydrofluoric acid; and
  an average linear thermal expansion coefficient of $70 \times 10^{-7}$/° C. or higher as measured in the range of from $-50°$ C. to 70° C.,
  in which a working temperature of the glass article: $T_4$ ° C. and a liquidus temperature of the glass article: $T_L$ ° C. satisfy the relationship: $T_4 - T_L \geq 0°$ C.

(4) A glass article having:
  a rate of dissolution in an acidic liquid of from 10 to 100 nm/min in terms of an etching rate in immersing in a 0.1% by weight 50° C. aqueous solution of hydrofluoric acid; and
  an average linear thermal expansion coefficient of $80 \times 10^{-7}$/° C. to $110 \times 10^{-7}$/° C. as measured in the range of from $-50°$ C. to 70° C.,
  in which a working temperature of the glass article: $T_4$ ° C. and a liquidus temperature of the glass article: $T_L$ ° C. satisfy the relationship: $T_4 - T_L \geq 0°$ C.

(5) The glass article according to any one of the items (1) to (4), wherein the rate of dissolution in an acidic liquid is 20 to 60 nm/min in terms of an etching rate in immersing in a 0.1% by weight 50° C. aqueous solution of hydrofluoric acid.

(6) The glass article according to any one of the items (1) to (4), wherein the rate of dissolution in an acidic liquid is 30 to 50 nm/min in terms of an etching rate in immersing in a 0.1% by weight 50° C. aqueous solution of hydrofluoric acid.

(7) The glass article according to any one of the items (1) to (6), which comprises:
  55 to 70 mol % $SiO_2$;
  2 to 15 mol % $Al_2O_3$;
  5 to 20 mol % $Li_2O$;
  5 to 25 mol % $Na_2O$;
  0 to 5 mol % $K_2O$;
  0.1 to 10 mol % MgO;
  1 to 15 mol % CaO;
  0 to 5 mol % SrO;
  0 to 5 mol % BaO;
  0 to 5 mol % $TiO_2$;
  0 to 5 mol % $ZrO_2$; and
  0 to 3 mol % other ingredient(s),
  wherein the sum of $Li_2O$, $Na_2O$ and $K_2O$ is 16 to 35 mol % and the sum of MgO, CaO, SrO and BaO is 1.5 to 20 mol %.

(8) The glass article according to any one of the items (1) to (6), which comprises:
  60 to 68 mol % $SiO_2$;
  4 to 10 mol % $Al_2O_3$;
  7 to 15 mol % $Li_2O$;
  8 to 20 mol % $Na_2O$;
  0 to 2 mol % $K_2O$;
  0.1 to 5 mol % MgO;
  1 to 8 mol % CaO;
  0 to 3 mol % SrO;
  0 to 2 mol % BaO;
  0 to 3 mol % $TiO_2$;
  0 to 3 mol % $ZrO_2$; and
  0 to 3 mol % other ingredient(s),
  wherein the sum of $Li_2O$, $Na_2O$ and $K_2O$ is 18 to 35 mol % and the sum of MgO, CaO, SrO and BaO is 1.5 to 10 mol %.

(9) The glass article according to any one of the items (1) to (6), which comprises:
  60 to 67 mol % $SiO_2$;
  4 to 8 mol % $Al_2O_3$;
  10 to 15 mol % $Li_2O$;
  10 to 20 mol % $Na_2O$;
  0 to 2 mol % $K_2O$;
  0.1 to 5 mol % MgO;
  1 to 8 mol % CaO;
  0 to 3 mol % SrO;
  0 to 2 mol % BaO;
  0 to 3 mol % $TiO_2$;
  0 to 5 mol % $ZrO_2$; and
  0 to 3 mol % other ingredient(s),
  wherein the sum of $Li_2O$, $Na_2O$ and $K_2O$ is 20 to 28 mol % and the sum of MgO, CaO, SrO and BaO is 2 to 10 mol %.

(10) The glass article according to any one of the items (1) to (9), which has been formed into a plate by a process comprising introducing a molten glass onto a bath of a molten tin.

(11) The glass article according to the item (10), which is a strengthened glass article obtained by immersing the glass article of claim 10 in a molten salt containing at least one of potassium ions and sodium ions to form a compression layer in the surfaces of the glass article by an ion exchange between the at least one of potassium ions and sodium ions in the molten salt and alkali ions in the glass article.

(12) A glass substrate for information recording media, which is obtained by polishing a surface of the glass article of the items (10) or (11).

DETAILED DESCRIPTION OF THE INVENTION

Modes for carrying out the invention will be explained below in detail. Hereinafter, the contents of all glass components are given in terms of mol % unless otherwise indicated. The reasons for limitations on properties of the glass article of the invention and on the content of each component thereof will be explained below.

(Coefficient of Thermal Expansion)

Reasons for limitations on the coefficient of thermal expansion are as follows. In an information recording device containing a magnetic recording medium employing a glass substrate, it is essential for normal information reading/writing to precisely maintain the position of the reading/writing head relative to the information signals (bits) recorded on the recording medium. With the trend toward higher recording densities, the relative positions of the bits and the reading/writing head have come to be required to have more precise dimensional accuracy. Because of this, shifts of the bit/head relative position caused by the difference in thermal expansion coefficient between the recording medium substrate and other parts have become unnegligible. It has become necessary to reduce the difference in thermal expansion coefficient between the substrate material and other materials.

Most of the materials (mainly metals) for use as mechanical components have a coefficient of thermal expansion of from $90 \times 10^{-7}$ to $100 \times 10^{-7}/°$ C. in the temperature range of from $-50°$ C. to $70°$ C. Consequently, a glass substrate for recording media which has a coefficient of thermal expansion of $70 \times 10^{-7}/°$ C. or higher so as to result in a difference between the substrate and those materials of $30 \times 10^{-7}/°$ C. at the most is desired. This regulation in thermal expansion coefficient is necessary for a magnetic recording device in which the magnetic recording medium is stably used while being rotated at a high speed at various temperatures. From this standpoint, the coefficient of thermal expansion of the glass substrate is more preferably $80 \times 10^{-7}/°$ C. or higher. In the case where the coefficient of thermal expansion of the glass is higher than that of metallic mechanical parts, it is preferably regulated to $110 \times 10^{-7}/°$ C. or lower for the same reason. When the coefficient of thermal expansion of the glass substrate and that of the metallic mechanical part which fixes and holds the glass substrate at its axial center are thus regulated so as to be within the respective given ranges, the possibility of arousing troubles attributable to a difference in thermal expansion coefficient is reduced.

(Etching Rate)

Reasons for limitations on the rate of dissolution in an acidic liquid are as follows. For producing a substrate for information recording media from a glass article, it is necessary to process the glass article so as to result in the size and thickness prescribed for the substrate. In addition, the surfaces thereof (especially both sides) should have an extremely high degree of smoothness and cleanness.

In this substrate production process, a glass article is processed through cutting, grinding, polishing, and cleaning steps in this order to realize the prescribed size and surface shape. In particular, in the cleaning step, it is essential to wash off unnecessary substances remaining on the surfaces of the polished glass article with pure water or another cleaning fluid. For this cleaning is preferably used an acidic cleaning fluid. This is because an acidic cleaning fluid not only has the effect of washing off unnecessary substances but also dissolves away a surface layer of the glass article in only a slight amount. Namely, a surface having exceedingly high cleanness can be obtained with an acidic cleaning fluid. However, in case where too large an amount of a surface layer of the glass article is dissolved away during the cleaning, the glass article comes to have excessive surface roughness, poor surface smoothness, or a surface alteration and is hence unable to be used as a substrate.

The rate of dissolution of the glass article in an acidic liquid is in the range of from 10 to 100 nm/min in terms of etching rate in immersion in a 0.1% by weight 50° C. aqueous solution of hydrofluoric acid. Etching rates thereof lower than 10 nm/min are undesirable in that the effect of enhancing the cleanness of the glass surfaces is insufficient. Examples of the unnecessary substances remaining on the glass surfaces include impurities which were contained in the abrasive grains used for polishing the main surfaces and edges of the glass or contained in the water or other ingredients used in the processing steps and have adhered to the glass especially upon glass drying, and further include glass particles. On the other hand, etching rates of the glass article exceeding 100 nm are undesirable in that although the cleaning effect is sufficient, the glass surfaces are roughened and a smooth surface is not obtained.

The rate of etching of the glass with hydrofluoric acid is preferably 30 nm/min or higher, more preferably 50 nm/min or higher, from the standpoint of more securely obtaining cleanness of the glass surfaces. On the other hand, from the standpoint of controlling the recesses and protrusions which are formed on the glass surfaces, the etching rate thereof is preferably 60 nm/min or lower, more preferably 50 nm/min or lower.

By regulating the rate of etching with hydrofluoric acid to a value within that range, a substrate for information recording media which has extremely smooth, highly clean surfaces can be realized.

($R_2O$)

In the glass article of the invention, the coefficient of thermal expansion is most influenced by the total content of alkali ingredients. Namely, as the content of $R_2O$ (=$Li_2O$+$Na_2O$+$K_2O$) increases, the coefficient of thermal expansion highly tends to become high. Consequently, for regulating the coefficient of thermal expansion of the glass article to $70 \times 10^{-7}/°$ C. or higher in the range of from $-50°$ C. to $70°$ C., the total content of all alkali ingredient $R_2O$ should be 16% or higher and is preferably 18% or higher, more preferably 20% or higher. On the other hand, the addition of alkali ingredients cuts the network structure of the glass and, hence, serves to lower the viscosity of the glass article. Although a decrease in the viscosity of the glass article has the excellent effect of lowering both the working temperature and the liquidus temperature, excessive addition of alkali ingredients tends to heighten rather than lower the liquidus temperature.

In order for a molten glass to be formed into a glass article by the float process, the melt should not devitrify during forming. Consequently, the difference between the working temperature $T_4$ and the liquidus temperature $T_L$, $T_4-T_L$, should be $-100°$ C. or more and is preferably $0°$ C. or more. From this standpoint, the total content of all alkali ingredients $R_2O$ in the glass article of the invention should be 35% or lower and is preferably 28% or lower.

($Li_2O$)

$Li_2O$ is a preferable component in the invention and has the following functions:
1) in an ion-exchange treatment with a molten salt containing potassium or with a molten salt mixture containing potassium and sodium, $Li_2O$ is replaced with potassium ions or sodium ions contained in the salt bath to thereby give a thick compression layer in the glass surfaces;
2) to heighten the coefficient of thermal expansion of the glass article;
3) to lower the melting temperature of the glass and thereby enhance meltability; and
4) to lower the liquidus temperature of the glass and thereby facilitate the formation of a glass melt into a glass article.

As long as the content of $Li_2O$ is 5% or higher, sufficient replacement with ions contained in the bath occurs in the ion-exchange treatment, whereby the glass article obtained through the ion-exchange treatment can have high strength. The content of $Li_2O$ is more preferably 7% or higher, most preferably 10% or higher.

On the other hand, the content of $Li_2O$ is preferably 20% or lower, more preferably 15% or lower. This is because in case where the $Li_2O$ content increases beyond 20%, the total content of all alkali ingredients $R_2O$ also increases, resulting in a tendency for the glass to devitrify. The content of $Li_2O$ is preferably 15% or lower from the standpoint of more surely inhibiting the glass from devitrifying.

($Na_2O$)

$Na_2O$ is a preferable component and has the following functions:
1) to heighten the coefficient of thermal expansion of the glass article, this effect being higher than that of $Li_2O$;
2) to lower the melting temperature of the glass and thereby enhance meltability;
3) to lower the liquidus temperature of the glass and thereby facilitate formation into a glass article; and
4) to be replaced with potassium ions in the bath in an ion-exchange treatment.

The content of $Na_2O$ is preferably 5% or higher, more preferably 8% or higher, most preferably 10% or higher. $Na_2O$ contents not lower than 5% are preferred in that the contents of other glass components can be selected from wider ranges in obtaining a glass article having a coefficient of thermal expansion of $70 \times 10^{-7}/°$ C. or higher in the temperature range of from $-50°$ C. to $70°$ C. $Na_2O$ contents not lower than 10% are preferred in that the contents of other components can be selected from even wider ranges.

On the other hand, the upper limit of the content of $Na_2O$ is preferably 25%, more preferably 20%. This is because in case where the $Na_2O$ content increases beyond 25%, the total content of all alkali ingredients $R_2O$ also increases, resulting in a tendency for the glass to devitrify. When the $Na_2O$ content is 20% or lower, unsusceptibility to devitrification is improved further.

($K_2O$)

$K_2O$ is an optional component and has the following functions:
1) to heighten the coefficient of thermal expansion of the glass article, this effect being far higher than those of $Li_2O$ and $Na_2O$;
2) to lower the melting temperature of the glass and thereby enhance meltability;
3) to lower the liquidus temperatures of the glass and thereby facilitate formation into a glass article; and
4) to heighten the working temperature and thereby facilitate formation into a glass article.

However, in case where $K_2O$ is incorporated in too large an amount, the ion-exchange treatment with a molten salt containing potassium ions is inhibited, making it difficult to strengthen the glass.

Consequently, the content of $K_2O$ is preferably 5% or lower, more preferably 2% or lower.

($SiO_2$)

$SiO_2$, which is preferable, is the main component constituting the glass. Increasing the $SiO_2$ content heightens the high-temperature viscosity of the glass article, resulting in a larger difference between the working temperature and the liquidus temperature. Namely, high $SiO_2$ contents facilitate conversion of batch materials into a glass. However, in case where the $SiO_2$ content is too high, the glass article has too high a high-temperature viscosity, resulting in impaired meltability. Increasing the $SiO_2$ content simultaneously brings about a decrease in thermal expansion coefficient. The preferred range of the $SiO_2$ content is hence determined while taking account of these two effects. In the glass article of the invention, the content of $SiO_2$ is preferably from 55 to 70%, more preferably from 60 or more. The $SiO_2$ content is more preferably 68% or lower, still more preferably 67% or lower.

($Al_2O_3$)

$Al_2O_3$ is a preferable component. $Al_2O_3$ has the following functions:
1) to increase the thickness of a compression stress layer to be formed in the glass surfaces by an ion-exchange treatment; and
2) to improve the water resistance of the glass article. On the other hand, in case where $Al_2O_3$ is contained in an excessively large amount, the glass has an increased high-temperature viscosity and impaired meltability and gives a glass article having a heightened liquidus temperature. The difference between the working temperature and the liquidus temperature hence becomes small, making it difficult to form the glass into a glass article. Furthermore, too high $Al_2O_3$ contents result in increased etching rates of the glass article, leading to glass surface deterioration. Consequently, the content of $Al_2O_3$ in the glass article of the invention is preferably 2% or higher, more preferably 4% or higher. For the reasons shown above, the content of $Al_2O_3$ is preferably 15% or lower, more preferably 10% or lower, most preferably 8% or lower.

(RO)

Bivalent-metal oxide ingredients RO (=MgO+CaO+SrO+BaO) are components which improve the meltability of the glass article. However, in case where these ingredients are added excessively, the glass comes to have too high a liquidus temperature and becomes difficult to form into a glass article. Consequently, the content of the bivalent-metal oxide ingredients RO (=MgO+CaO+SrO+BaO) is preferably from 1.5 to 20%, more preferably from 1.5 to 10%, most preferably from 2 to 10%.

(MgO)

MgO is a preferable component. Of the bivalent-metal oxide ingredients RO, MgO not only has the effect of enhancing meltability but also serves to remarkably accelerate ion-exchange reactions in chemical strengthening. Since MgO, among the bivalent-metal oxide ingredients RO, accelerates ion exchange, it produces this effect when incorporated in an amount of 0.1% or higher. However, MgO is less effective in heightening the coefficient of thermal expansion as compared with the other RO ingredients, i.e., CaO, SrO, and BaO. Consequently, MgO contents as high as above 10% are undesirable in that the coefficient of thermal expansion becomes low. In the glass article of the invention, the content of MgO is preferably 10% or lower, more preferably 5% or lower.

(CaO)

CaO is a preferable component because CaO not only has the effect of enhancing meltability but also serves to remarkably heighten the coefficient of thermal expansion. When the CaO content is 1% or higher, these effects are sufficiently produced. On the other hand, in case where the CaO content exceeds 15%, the liquidus temperature rises and formation into a glass article becomes difficult. Consequently, the content of CaO is preferably 15% or lower, more preferably 8% or lower.

(SrO)

SrO is an optional component. SrO serves:
1) to heighten the coefficient of thermal expansion of the glass most effectively among the RO ingredients;
2) to lower the liquidus temperature of the glass; and
3) to enhance the meltability of the glass article.

However, SrO is undesirable in that it heightens the density of the glass article and is expensive as compared with other components. Although the incorporation of SrO in the glass article is preferred, the content thereof is preferably 5% or lower for these reasons, and is more preferably 3% or lower.

(BaO)

BaO is a component having the following excellent effects:
1) to heighten the coefficient of thermal expansion of the glass, BaO being second in this effect to SrO among the RO ingredients;
2) to greatly lower the liquidus temperature of the glass; and
3) to enhance the meltability of the glass article.

However, BaO has such undesirable properties that it increases the density of the glass article more than SrO and it inhibits ion exchange in an ion-exchange treatment and hence makes no contributes to a strength improvement through the treatment. Adding BaO in too large an amount is hence undesirable. Consequently, the content of BaO is preferably 5% or lower, more preferably 2% or lower.

(Others)

Ingredients other than those described above may be added in a total amount of up to 3%. Examples of such optional ingredients include $TiO_2$ for improving the weatherability of the glass article and $Sb_2O_3$, $SO_3$, $SnO_2$, $Fe_2O_3$, and CoO for coloring, melt clarification, etc.

In producing the glass article of the invention, a bubble-free homogeneous glass melt can be obtained without using $As_2O_3$, which is a harmful substance, or chlorine or fluorine, which both may pollute the environment, as a clarificant because the melt can be made to have a low viscosity at high temperatures. Consequently, the glass article of the invention can be substantially free from these substances.

From the glass melt limited in composition as described above, glass articles can be easily produced in large quantities by a continuous process, especially by the float process in which a molten glass is formed into a plate by being introduced onto a tin bath, due to the proper contents of the components. The glass obtained has a high coefficient of thermal expansion even at low temperatures.

When the glass article of the invention which contains $Li_2O$ and $Na_2O$ is immersed in a molten salt containing potassium ions or sodium ions or both at a temperature not higher than the strain point of the glass, these components of the glass are readily replaced with an ingredient (ions) having a larger ionic radius. As a result, a compression stress is generated in a surface layer extending deeply, whereby the fracture strength of the glass can be further heightened.

EXAMPLES

The invention will be explained below in more detail by reference to Examples and Comparative Examples.

Example 1

(Production of Glass)

Common raw glass materials including silica sand, spodumene, alumina, lithium carbonate, sodium carbonate, potassium carbonate, dolomite, limestone, titania, zircon sand, and iron oxide were mixed together to prepare a batch so as to result in the composition shown in Table 1. This batch was melted by heating to 1,550° C. in a platinum crucible and then held at this temperature for 4 hours. The resultant molten glass was poured on an iron plate. After the pouring on the iron plate, the glass melt solidified in 100-odd seconds. Immediately after the solidification, the glass was placed in an electric furnace set at 600° C. After 30 minutes, the electric furnace was switched off to allow the glass to cool gradually to room temperature. Thus, a glass was obtained.

(Property Measurements)

The high-temperature viscosity of the glass was measured with a platinum ball lifting type automatic viscometer. The temperatures at which the viscosity of the glass melt reached $10^2$ P and $10^4$ P were determined and taken as the melting temperature $T_2$ and the working temperature $T_4$, respectively.

The density and etching rate of the glass were measured in the following manner. The glass was cut into a size of 5×40×30 mm, and each side was mirror-polished to produce a platy sample. First, the density of the platy sample was determined by the Archimedes method. Subsequently, the sample was washed with pure water. The mirror surface on one side of the sample was partly masked, and this sample was immersed for 2.5 minutes in a hydrofluoric acid solution having a concentration of 0.1% by weight and a temperature of 50° C. and then washed with water. Thereafter, the mask was removed, and the level difference at the boundary between the area which had been masked and the area which had not been masked was measured with a surface roughness meter. From this value of the level difference resulting from the etching, the etching rate was calculated.

Furthermore, a cylindrical sample having a diameter of 5 mm and a length of 15 mm was produced and examined with an ordinary thermal expansion meter to determine the transition temperature, yield point, and average coefficients of thermal expansion respectively in the ranges of from −50° C. to 70° C. and from 50 to 350° C.

The liquidus temperature was determined in the following manner. The glass was pulverized with an agate mortar. This glass powder was screened to obtain glass particles which had passed through a sieve having an opening size of 2,380 μm and stayed on a sieve having an opening size of 1,000 μm. These glass particles were subjected to ultrasonic cleaning in methanol and then dried to obtain a sample for liquidus temperature measurement. A 25 g portion was weighed out of the sample and transferred to a platinum boat having a width of 12 mm and a length of 200 mm. This boat was held in a temperature-gradient furnace for 2 hours and then taken out. This glass was examined with an optical microscope for crystals which had generated therein (devitrification). The maximum temperature which resulted in crystal formation was taken as the liquidus temperature.

Suitability for ion exchange was evaluated in the following manner. The glass was cut into a size of 5×40×30 mm, and each side was mirror-polished to obtain a sample. This sample was immersed for 4 hours in a molten salt consisting of an 8:2 mixture of $KNO_3$ and $NaNO_3$ and having a temperature of 380° C. Thereafter, the sample was cut into a size of 5×20×30 mm and a cut surface was polished. This cut sample was examined by X-ray analysis with an X-ray microanalyzer to determine the depth to which potassium ions and sodium ions had penetrated from the glass surface. The found values obtained are summarized in Table 1.

Examples 2 to 11

Glass samples were produced in the same manner as in Example 1, except that the proportions of the raw glass materials for batch preparation were changed so as to result in the glass compositions for the respective Examples shown in Table 1. In each Example, a platy sample and a cylindrical sample were produced and examined for properties, in the same manner as in Example 1. The results of the examinations are also shown in Table 1.

precise polishing with free abrasive grains of cerium oxide having a smaller average particle diameter so as to result in a thickness of 0.8 mm. For these polishing operations, a known technique and apparatus were used. The doughnut glass thus polished was immersed for 4 hours in a molten salt consisting of an 8:2 (by weight) mixture of potassium nitrate and sodium nitrate and having a temperature of 380° C. to strengthen the glass by ion exchange.

The doughnut glass which had undergone the ion-exchange treatment was washed with dilute hydrofluoric acid and pure water. Thereafter, a surface of the glass was examined with an atomic force microscope (AFM). As a result, the average surface roughness Ra thereof was found to be about 0.4 nm. On this substrate were successively

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Composition (mol %) | $SiO_2$ | 63.0 | 64.0 | 67.0 | 64.0 | 65.2 | 65.0 | 61.5 | 65.5 | 66.0 | 64.5 | 66.0 |
| | $Al_2O_3$ | 4.0 | 5.0 | 10.0 | 4.0 | 5.3 | 8.0 | 4.0 | 7.5 | 9.0 | 7.5 | 9.0 |
| | $Li_2O$ | 11.0 | 12.0 | 8.0 | 8.5 | 10.0 | 10.0 | 15.0 | 9.0 | 10.0 | 9.5 | 8.0 |
| | $Na_2O$ | 12.0 | 13.0 | 11.0 | 19.0 | 17.5 | 14.5 | 13.0 | 16.0 | 11.2 | 14.0 | 11.0 |
| | $K_2O$ | 0.3 | 0.3 | 0.3 | 0.3 | 0.3 | 0.3 | 0.3 | 0.3 | 0.3 | 0.3 | 0.3 |
| | MgO | 3.6 | 1.6 | 1.6 | 1.6 | 0.6 | 1.1 | 4.0 | 0.6 | 2.0 | 1.1 | 1.6 |
| | CaO | 6.2 | 4.2 | 2.2 | 2.7 | 1.2 | 1.2 | 2.3 | 1.2 | 1.6 | 1.2 | 2.2 |
| | SrO | 0 | 0 | 0 | 0 | 0 | 0 | 0 | 0 | 0 | 2.0 | 0 |
| | BaO | 0 | 0 | 0 | 0 | 0 | 0 | 0 | 0 | 0 | 0 | 2.0 |
| | $TiO_2$ | 0 | 0 | 0 | 0 | 0 | 0 | 0 | 0 | 0 | 0 | 0 |
| | $ZrO_2$ | 0 | 0 | 0 | 0 | 0 | 0 | 0 | 0 | 0 | 0 | 0 |
| | $Y_2O_3$ | 0 | 0 | 0 | 0 | 0 | 0 | 0 | 0 | 0 | 0 | 0 |
| Total alkali content $R_2O$ (mol %) | | 23.3 | 25.3 | 19.3 | 27.8 | 27.8 | 24.8 | 28.3 | 25.3 | 21.5 | 23.8 | 19.3 |
| Total alkaline earth content RO (mol %) | | 9.8 | 5.8 | 3.8 | 4.3 | 1.8 | 2.3 | 6.3 | 1.8 | 3.6 | 4.3 | 5.8 |
| Coefficient of thermal expansion ($\times 10^{-7}/°$ C.) | 50 to 350° C. | 106 | 108 | 92 | 116 | 113 | 104 | 113 | 106 | 96 | 105 | 94 |
| | −50 to 70° C. | 84 | 84 | 72 | 100 | 94 | 84 | 91 | 83 | 73 | 81 | 72 |
| | Evaluation | ◎ | ◎ | ○ | ◎ | ◎ | ◎ | ◎ | ◎ | ○ | ◎ | ○ |
| Density, g/cm³ | | 2.51 | 2.46 | 2.51 | 2.45 | 2.42 | 2.46 | 2.43 | 2.46 | 2.49 | 2.49 | 2.55 |
| Liquidus temperature $T_L$, ° C. | | 876 | 780 | 948 | 740 | 972 | 872 | 879 | 840 | 901 | 829 | 914 |
| Melting temperature $T_2$, ° C. | | 1265 | 1257 | 1389 | 1168 | 1206 | 1285 | 1226 | 1264 | 1360 | 1316 | 1401 |
| Working temperature $T_4$, ° C. | | 912 | 900 | 1042 | 872 | 885 | 947 | 842 | 943 | 999 | 941 | 1021 |
| Glass transition point $T_g$, ° C. | | 425 | 390 | 487 | 411 | 387 | 410 | 332 | 418 | 437 | 419 | 478 |
| Yield point $A_t$, ° C. | | 494 | 474 | 563 | 479 | 470 | 501 | 424 | 506 | 528 | 495 | 545 |
| $T_4-T_L$, ° C. | | 36 | 120 | 94 | 132 | −87 | 75 | −37 | 103 | 98 | 112 | 107 |
| Etching rate | nm/min | 48 | 34 | 40 | 41 | 27 | 89 | 99 | 98 | 46 | 85 | 41 |
| | Evaluation | ◎ | ◎ | ◎ | ◎ | ◎ | ◎ | ◎ | ◎ | ◎ | ◎ | ◎ |
| Depth of ion exchange | μm | 86 | 119 | 132 | 170 | 75 | 119 | 148 | 93 | 151 | 113 | 125 |
| | Evaluation | ◎ | ◎ | ◎ | ◎ | ◎ | ◎ | ◎ | ◎ | ◎ | ◎ | ◎ |

(Substrate Production and Performance Examinations)

A glass substrate for magnetic recording media was produced in the following manner. A batch prepared so as to result in the same composition as in Example 1 was continuously introduced into a glass-melting furnace equipped with an apparatus for plate formation by the float process. The batch was melted by heating to a maximum temperature of from 1,500 to 1,550° C. This molten glass was poured via a clarifying tank onto a molten tin bath (float bath), formed into a plate having a given thickness, subsequently gradually cooled in a continuous lehr, and then cut.

The glass obtained was cut into a doughnut shape having an outer diameter of 95 mm and an inner diameter of 25 mm, and the inner and outer edges were beveled and polished. Subsequently, free abrasive grains of cerium oxide having an average particle diameter of from 5 to 10 μm was used to conduct rough polishing. This glass was further subjected to deposited a chromium film, cobalt-chromium-tantalum magnetic film, and carbon film respectively as an undercoat film, recording film, and protective film by sputtering. A lubricating film was formed on the surface of this protective film by applying an organic solvent solution of a perfluorocarbon. The magnetic recording medium thus obtained was attached to a closed-type hard-disk drive by a known method. While the drive was kept being operated at each of 10,000 rpm and 12,000 rpm, the temperature was elevated and lowered repeatedly between −50° C. and 70° C. As a result, no troubles such as, e.g., reading/writing errors or head crushing occurred.

Comparative Examples 1 to 4

The glass compositions of Comparative Examples 1 to 4 are shown in Table 2. All these glasses are outside the scope of the invention. In particular, the composition of Comparative Example 1 is the composition which is disclosed in the Example 1 of Japanese Patent Laid-Open No. 357318/2000 and is thought to be most characteristic of this related-art technique among the glasses shown therein. The composition of Comparative Example 2 is the composition which is disclosed in the Example 20 of the same reference, i.e., Japanese Patent Laid-Open No. 357318/2000, and is thought to be the closest, among the Examples shown therein, in composition to the glass article of the invention. The composition of Comparative Example 3 is the composition of the Example 1 of Japanese Patent Laid-Open No. 301732/1997. The composition of Comparative Example 4 is a soda-lime glass composition for building window glasses.

TABLE 2

|  |  | Comparative Example | | | |
|---|---|---|---|---|---|
|  |  | 1 | 2 | 3 | 4 |
| Composition | $SiO_2$ | 66.0 | 61.4 | 69.1 | 71.6 |
| (mol %) | $Al_2O_3$ | 5.0 | 7.0 | 10.7 | 0.9 |
|  | $Li_2O$ | 6.0 | 6.0 | 0 | 0 |
|  | $Na_2O$ | 0.8 | 3.2 | 7.1 | 12.7 |
|  | $K_2O$ | 0.5 | 4.3 | 7.2 | 0.5 |
|  | MgO | 5.5 | 5.5 | 5.6 | 6.0 |
|  | CaO | 5.7 | 5.6 | 0.4 | 8.4 |
|  | SrO | 3.5 | 2.6 | 0 | 0 |
|  | BaO | 0 | 0 | 0 | 0 |
|  | $TiO_2$ | 3.5 | 2.0 | 0 | 0 |
|  | $ZrO_2$ | 1.5 | 1.2 | 0 | 0 |
|  | $Y_2O_3$ | 2.0 | 1.2 | 0 | 0 |
| Total alkali content $R_2O$ (mol %) | | 7.3 | 13.5 | 14.3 | 13.2 |
| Total alkaline earth content RO (mol %) | | 14.7 | 13.7 | 6.0 | 14.4 |
| Coefficient of thermal expansion ($\times 10^{-7}/°$ C.) | 50 to 350° C. | 72 | 90 | 89 | 90 |
|  | −50 to 70° C. | 60 | 65 | 74 | 75 |
|  | Evaluation | × | × | ○ | ○ |
| Density, g/cm³ | | 2.68 | 2.66 | 2.6 | 2.63 |
| Liquidus temperature $T_L$, ° C. | | 1098 | 1058 | 995 | 1001 |
| Melting temperature $T_2$, ° C. | | 1623 | 1501 | 1463 | 1472 |
| Working temperature $T_4$, ° C. | | 1084 | 1040 | 1264 | 1041 |
| Glass transition point $T_g$, ° C. | | 633 | 578 | 615 | 556 |
| Yield point $A_t$, ° C. | | | | | |
| $T_4-T_L$, ° C. | | −14 | −18 | 269 | 40 |
| Etching rate | nm/min | 8 | 336 | 164 | 5 |
|  | Evaluation | △ | × opacified | ○ | △ |
| Depth of ion exchange | μm | 15 | 6 | <1 | 11 |
|  | Evaluation | × | × | × | × |

Sample glasses were produced in the same manner as in the Examples, except that batches were prepared so as to result in the compositions shown in Table 2. In Comparative Example 1, however, a sample glass was produced in the following manner. The batch prepared was held at 1,600° C. for 16 hours with a platinum crucible and then poured on an iron plate. This glass was held at 650° C. for 30 minutes in an electric furnace. Thereafter, the furnace was switched off to allow the glass to cool to room temperature. The density, liquidus temperature, and other properties of each of these sample glasses were measured or calculated in the same manners as in the Examples. The results obtained are shown in Table 2.

The glass of Comparative Example 1 was found to have an exceedingly low coefficient of thermal expansion in the temperature range of from −50° C. to 70° C. In information recording devices employing such a glass having a low coefficient of thermal expansion as the information recording medium substrate, it is expected that when the temperature changes, the accuracy of the relative positions of a recording/reproducing head and recording bits becomes difficult to maintain due to the difference in thermal expansion coefficient between the substrate and the metallic mechanical part holding it.

The glass of Comparative Example 2 also was found to have a far lower coefficient of thermal expansion in the temperature range of from −50° C. to 70° C. than the glass articles of the invention. In this case, the same difficulties as in Comparative Example 1 are expected.

A point in which the glasses of Comparative Examples 1 and 2 distinctly differ from the Examples according to the glass article of the invention is the total content of alkali oxides $R_2O$. It can be seen that for obtaining an average coefficient of thermal expansion of $70 \times 10^{-7}/°$ C. or higher in the temperature range of from −50° C. to 70° C., the content of $R_2O$ is desirably regulated to 16% or higher as in the invention.

The glasses of Comparative Examples 1 and 4 had too low a rate of dissolution in hydrofluoric acid to have a clean surface. Although the dissolution rate is increased by heightening the concentration of hydrofluoric acid in the immersion solution or elevating the temperature of the solution, use of a higher solution temperature is disadvantageous in that the concentration of the solution is apt to fluctuate due to the volatilization of hydrofluoric acid, etc. and there is the possibility that the acid volatilized might adversely influence the health of the worker or the global environment. Furthermore, to heighten the concentration of the solution is undesirable in that it not only increases the chemical danger of the solution but also results in a cost increase due to the necessity of a large amount of the chemical.

On the other hand, the glass of Comparative Example 2 had too high a rate of dissolution in hydrofluoric acid and, hence, the dissolution of a surface layer occurred excessively. As a result, the glass opacified like frosted glasses. Namely, the glass came to have an excessively high average surface roughness. In this case, the rate of dissolution may be reduced by lowering the concentration of the immersion solution. However, even with such a measure, it has been difficult to obtain a glass surface combining excellent smoothness and high cleanness. This is because glasses having a high rate of dissolution in acids intrinsically have poor acid resistance and are highly probable to undergo partial dissolution.

Furthermore, in the glasses of Comparative Examples 1 to 4, the thickness of the layer which had undergone ion exchange was not larger than 20 μm. This indicates that these glasses had undergone substantially no ion exchange. In particular, the glass of Comparative Example 3 had an ion-exchanged-layer thickness less than 1 μm, showing that no ion exchange had occurred therein at all. These glasses cannot give a glass article having enhanced strength even through an ion-exchange treatment. It is hence thought that these glasses, when used as substrates for information recording media, have the higher possibility of breakage than the samples of the Examples.

The glass article of the invention has a rate of dissolution in an acidic liquid of from 10 to 100 nm/min in terms of etching rate in immersion in a 0.1% by weight 50° C. aqueous solution of hydrofluoric acid and an average coefficient of linear thermal expansion of $70 \times 10^{-7}/°$ C. or higher as measured in the range of from −50° C. to 70° C., and the working temperature $T_4$ (° C.) and the liquidus temperature $T_L$ (° C.) thereof satisfy the relationship $T_4-T_L \geq -100°$ C.

Due to this constitution, by cleaning the surfaces of the glass with an acidic liquid having the ability to dissolve away a surface layer therefrom, the glass surfaces can be made clean without being deteriorated. When the glass article of the invention is used as a glass substrate for information recording media and held by a metallic mechanical part to fabricate a recording device, the accuracy of the relative positions of a head for recorded-signal readout and recording bits can be maintained even when the temperature of the atmosphere in which the recording device is used fluctuates, because the difference in coefficient of linear thermal expansion between the glass article of the invention and the metallic mechanical part is small. Thus, the recording device can have high reliability. Furthermore, the glass of the invention has temperature properties suitable for the float process, in which a glass melt is introduced onto a molten tin bath and formed into a plate. The glass article of the invention can hence be produced industrially.

In addition, when the glass article of the invention which contains alkali ingredients in respective given amounts and in a given total amount is subjected to a strengthening treatment by the ion-exchange method, then a compression stress layer is formed which extends from the surface to a deep inner part. Thus, a highly reliable glass having mechanical strength can be obtained.

In the recording device employing a glass substrate for magnetic recording media obtained by polishing the surfaces of the glass article of the invention and then cleaning it with an acidic liquid, the recording medium has high mechanical strength and recorded-signal readout can be stably conducted even when the temperature of the atmosphere fluctuates.

The entire disclosure of each and every foreign patent application from which the benefit of foreign priority has been claimed in the present application is incorporated herein by reference, as if fully set forth.

What is claimed is:

1. A glass article having:
    a rate of dissolution in an acidic liquid of from 20 to 60 nm/min in terms of an etching rate in immersing in a 0.1% by weight 50° C. aqueous solution of hydrofluoric acid; and
    an average linear thermal expansion coefficient of $70 \times 10^{-7}/°$ C. or higher as measured in the range of from $-50°$ C. to $70°$ C.,
    in which a working temperature of the glass article: $T_4$ ° C. and a liquidus temperature of the glass article: $T_L$ ° C. satisfy the relationship: $T_4 - T_L \geq -100°$ C.,
    and the glass article comprising:
        60 to 68 mol % $SiO_2$;
        4 to 10 mol % $Al_2O_3$;
        7 to 15 mol % $Li_2O$;
        8 to 20 mol % $Na_2O$;
        0 to 2 mol % $K_2O$;
        0.1 to 5 mol % MgO;
        1 to 8 mol % CaO;
        0 to 3 mol % SrO;
        0 to 2 mol % BaO;
        0 to 3 mol % $TiO_2$;
        0 to 3 mol % $ZrO_2$; and
        0 to 3 mol % other ingredient(s),
        wherein the sum of $Li_2O$, $Na_2O$ and $K_2O$ is 18 to 35 mol % and the sum of MgO, CaO, SrO and BaO is 1.5 to 10 mol %.

2. The glass article of claim 1 having:
    an average linear thermal expansion coefficient of $80 \times 10^{-7}/°$ C. to $110 \times 10^{-7}/°$ C. as measured in the range of from $-50°$ C. to $70°$ C.

3. The glass article of claim 1 in which:
    a working temperature of the glass article: $T_4$ ° C. and a liquidus temperature of the glass article: $T_L$ ° C. satisfy the relationship: $T_4 - T_L \geq 0°$ C.

4. The glass article of claim 2 in which:
    a working temperature of the glass article: $T_4$ ° C. and a liquidus temperature of the glass article: $T_L$ ° C. satisfy the relationship: $T_4 - T_L \geq 0°$ C.

5. The glass article of claim 1, wherein the rate of dissolution in an acidic liquid is 30 to 50 nm/min in terms of an etching rate in immersing in a 0.1% by weight 50° C. aqueous solution of hydrofluoric acid.

6. The glass article according to claim 1, which comprises:
    60 to 67 mol % $SiO_2$;
    4 to 8 mol % $Al_2O_3$;
    10 to 15 mol % $Li_2O$;
    10 to 20 mol % $Na_2O$;
    0 to 2 mol % $K_2O$;
    0.1 to 5 mol % MgO;
    1 to 8 mol % CaO;
    0 to 3 mol % SrO;
    0 to 2 mol % BaO;
    0 to 3 mol % $TiO_2$;
    0 to 5 mol % $ZrO_2$; and
    0 to 3 mol % other ingredient(s),
    wherein the sum of $Li_2O$, $Na_2O$ and $K_2O$ is 20 to 28 mol % and the sum of MgO, CaO, SrO and BaO is 2 to 10 mol %.

7. The glass article according to claim 1, which has been formed into a plate by a process comprising introducing a molten glass onto a bath of a molten tin.

8. The glass article according to claim 7, which is a strengthened glass article obtained by immersing the glass article of claim 7 in a molten salt containing at least one of potassium ions and sodium ions to form a compression layer in the surfaces of the glass article by an ion exchange between the at least one of potassium ions and sodium ions in the molten salt and alkali ions in the glass article.

9. A glass substrate for information recording media, which is obtained by polishing a surface of the glass article of claim 7 or 8.

* * * * *